US007016517B2

(12) United States Patent
Furusho

(10) Patent No.: US 7,016,517 B2
(45) Date of Patent: Mar. 21, 2006

(54) TRAVEL ROAD DETECTOR

(75) Inventor: Hiroyuki Furusho, Yokohama (JP)

(73) Assignee: Nissan Motor Co., Ltd., Yokohama (JP)

( * ) Notice: Subject to any disclaimer, the term of this patent is extended or adjusted under 35 U.S.C. 154(b) by 629 days.

(21) Appl. No.: 10/163,424

(22) Filed: Jun. 7, 2002

(65) Prior Publication Data

US 2003/0001732 A1    Jan. 2, 2003

(30) Foreign Application Priority Data

Jun. 29, 2001   (JP) ............................. 2001-199959

(51) Int. Cl.
*G06K 9/00* (2006.01)
(52) U.S. Cl. .................................................. 382/103
(58) Field of Classification Search ........ 382/103–107, 382/266–269, 181, 190
See application file for complete search history.

(56) References Cited

U.S. PATENT DOCUMENTS

| | | | | | |
|---|---|---|---|---|---|
| 5,555,312 | A   * | 9/1996  | Shima et al. ............... | 382/104 |
| 6,205,234 | B1 * | 3/2001  | Kakinami et al. .......... | 382/104 |
| 6,489,887 | B1 * | 12/2002 | Satoh et al. ................ | 340/436 |
| 6,493,458 | B1 * | 12/2002 | Yasui et al. ................. | 382/104 |
| 6,819,779 | B1 * | 11/2004 | Nichani ....................... | 382/104 |
| 6,850,628 | B1 * | 2/2005  | Shirato ........................ | 382/104 |
| 6,879,706 | B1 * | 4/2005  | Satoh et al. ................. | 382/104 |

FOREIGN PATENT DOCUMENTS

| | | |
|---|---|---|
| JP | 6-020189   | 1/1994 |
| JP | 8-261756   | 10/1996 |
| JP | 11-073514  | * 3/1999 |
| JP | 11-281352  | 10/1999 |
| JP | 2000-36037 | 2/2000 |

* cited by examiner

*Primary Examiner*—Jose L. Couso
*Assistant Examiner*—Tom Y. Lu
(74) *Attorney, Agent, or Firm*—Foley & Lardner LLP

(57) ABSTRACT

A travel road detector includes: an image pickup section producing a road image of a forward travel road in front of a driver's vehicle; a setting section setting small areas for lane marker detection; a lane marker detector detecting lane markers on both sides of a travel lane for the driver's vehicle; a first calculator calculating a travel road model parameter representing a shape of the forward travel road when a both-side lane marker detecting state is satisfied; a forward vehicle detector detecting a height of a predetermined part of a forward vehicle traveling ahead of the driver's vehicle when the both-side lane marker detecting state is present; and a second calculator calculating the travel road model parameter from information on the lane marker detection points, and information on the height of the predetermined part of the forward vehicle detected with the forward vehicle detector.

19 Claims, 6 Drawing Sheets

LANE MARKER DETECTOR WINDOW FOR LEFT WHITE LINE (i-th LANE MARKER DETECTOR WINDOW)

WHITE LINE

WHITE LINE CANDIDATE POINT

CANDIDATE OF WHITE LINE
$y = a_x \cdot x + b_x$

FIG. 5
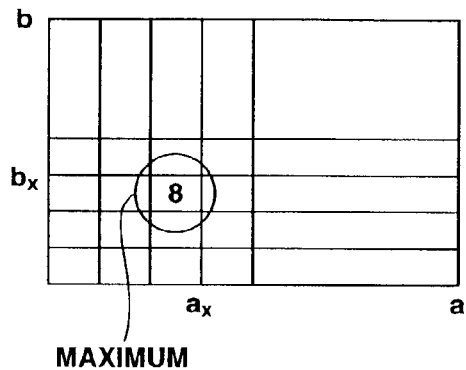
MAXIMUM
FIG. 6
| THE NUMBER OF THE LANE MARKER DETECTOR WINDOW | a | b |
|---|---|---|
| 1 | | |
| ⋮ | | |
| i | $a_x$ | $b_x$ |
| | | |
FIG. 7
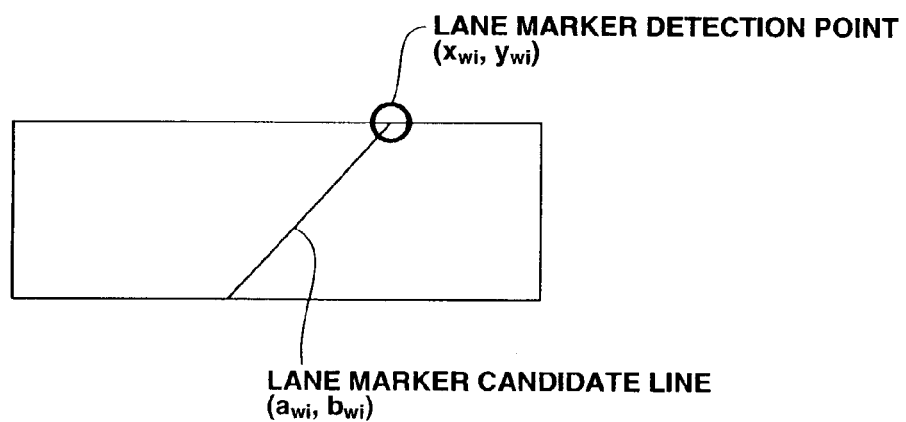
LANE MARKER DETECTION POINT $(x_{wi}, y_{wi})$
LANE MARKER CANDIDATE LINE $(a_{wi}, b_{wi})$

```
000000000000000000000000000000
011111111111111111111111111110
011111111111111111111111111110
011111111111111111111111111110
011111111111111111111111111110
000000000000000000000000000000
```

TRAVEL ROAD DETECTOR

BACKGROUND OF THE INVENTION

The present invention relates to a travel road detector for detecting a shape of a travel road for a driver's vehicle. Especially, the present invention relates to the travel road detector that is preferable for showing the shape of the travel road with a travel road model parameter.

Japanese Patent Unexamined Publication No. Heisei 6(1994)-020189 describes a road shape measuring instrument for calculating the travel road model parameter with a state estimator such as Kalman filter and the like.

BRIEF SUMMARY OF THE INVENTION

Use of the state estimator such as Kalman filter and the like for the travel road detector is, as the case may be, incapable of accurately calculating each of the travel road model parameters when a lane marker can be detected on only one of the right side and the left side of the travel lane for the driver's vehicle, although the accurate calculation of the travel road model parameters depends on the number of parameters and types of the parameters.

It is therefore an object of the present invention to provide a travel road detector capable of accurately calculating each of travel road model parameters even when the lane marker can be detected on only one of the right side and the left side of the travel lane for the driver's vehicle.

According to a first aspect of the present invention, there is provided a travel road detector.

The travel road detector comprises: 1) an image pickup section producing a road image of a forward travel road in front of a driver's vehicle; 2) a setting section setting, on the road image, small areas for lane marker detection; 3) a lane marker detector detecting, in the small areas, lane markers on both sides of a travel lane for the driver's vehicle as lane marker detection points; 4) a first calculator determining that a both-side lane marker detecting state is present when the number of lane marker detection points of the lane marker on each side of the travel lane is greater than or equal to a first predetermined numerical quantity, and at the same time the total number of lane marker detection points of the lane markers on both sides of the travel lane is greater than or equal to a second predetermined numerical quantity, and calculating, from information on the lane marker detection points, a travel road model parameter representing a shape of the forward travel road when the both-side lane marker detecting state is satisfied; 5) a forward vehicle detector detecting a height of a predetermined part of a forward vehicle traveling ahead of the driver's vehicle when the both-side lane marker detecting state is present; and 6) a second calculator determining that a one-side lane marker detecting state is present when the both-side lane marker detecting state is not present, and at the same time the number of lane marker detection points of the lane marker on either one side of the travel lane for the driver's vehicle is greater than or equal to a third predetermined numerical quantity, and calculating the travel road model parameter from information on the lane marker detection points, and information on the height of the predetermined part of the forward vehicle detected with the forward vehicle detector.

According to a second aspect of the present invention, there is provided a process of detecting a travel road.

The process of detecting a travel road comprises the following operations: 1) producing a road image of a forward travel road in front of a driver's vehicle; 2) setting small areas for lane marker detection; 3) detecting lane markers; 4) firstly determining that a both-side lane marker detecting state is present; 5) firstly calculating a travel road model parameter representing a shape of the forward travel road when the both-side lane marker detecting state is satisfied; 6) detecting a height of a predetermined part of a forward vehicle when the both-side lane marker detecting state is present; 7) secondly determining that a one-side lane marker detecting state is present; and 8) secondly calculating the travel road model parameter from information on the lane marker detection points, and information on the height of the predetermined part of the forward vehicle detected with the forward vehicle detector.

According to a third aspect of the present invention, there is provided a travel road detecting apparatus.

The travel road detecting apparatus comprises: 1) image pickup means for picking up an image of a travel road in front of a driver's vehicle; 2) setting means for setting small areas for detecting a lane marker; 3) lane marker detecting means for detecting a part of the lane marker; 4) first calculating means for determining whether or not the lane marker detection point detected with the lane marker detecting means is in a first both-side lane marker detecting state, and for calculating a travel road model parameter when both the first both-side lane marker detecting state and the second both-side lane marker detecting state are determined to be established; 5) forward vehicle detecting means for detecting at least a height of a predetermined part of a forward vehicle traveling ahead of the driver's vehicle; and 6) second calculating means for determining whether or not the lane marker detection point detected with the lane marker detecting means is in a one-side lane marker detecting state for determining whether or not at least the height of the predetermined part of the forward vehicle is detected, and for calculating the travel road model parameter, from the following pieces of first information and second information: the first information on the thus determined lane marker detection points, and the second information on the thus determined at least the height of the predetermined part of the forward vehicle.

The other objects and features of the present invention will become understood from the following description with reference to the accompanying drawings.

BRIEF DESCRIPTION OF THE SEVERAL VIEWS OF THE DRAWINGS

FIG. 5 shows a matrix for detecting the lane marker candidate points;

FIG. 6 shows a table of the lane marker candidate line thus detected;

FIG. 7 shows a lane marker detection point;

FIG. 9 shows graphs for describing formulations, in which;

DETAILED DESCRIPTION OF THE EMBODIMENTS

In the following, an embodiment of the present invention will be described in detail with reference to the accompanying drawings.

For ease of understanding, the following description will contain various directional terms, such as, left, right, upper, lower and the like. However, such directional terms are to be understood with respect to only a drawing or drawings on which the corresponding part of element is illustrated.

Figure 1:
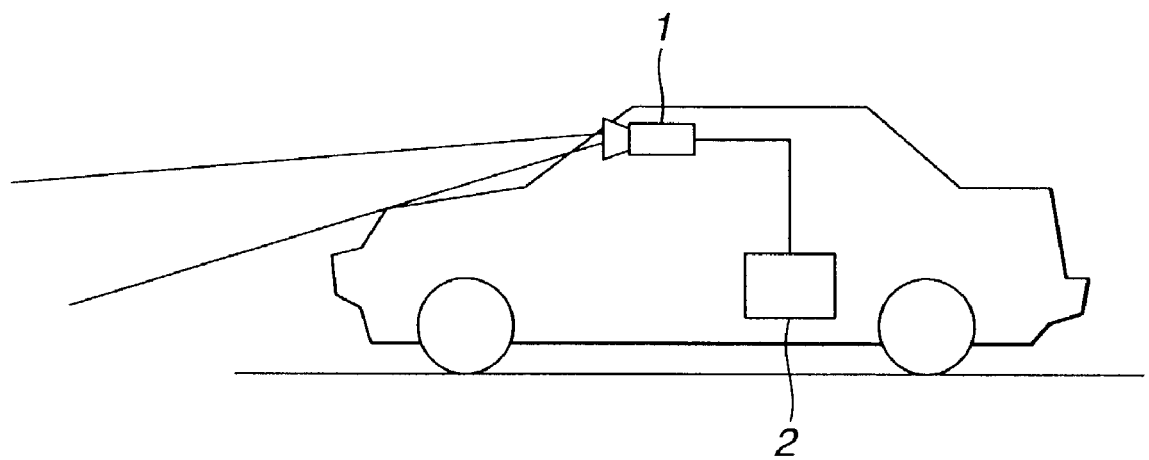
FIG. 1 shows a schematic diagram of a travel road detector, according to an embodiment of the present invention.

As is seen in FIG. 1, there is provided a systematic shape of a travel road detector, according to the embodiment of the present invention.

The travel road detector according to the embodiment comprises an image pickup section 1 and a control unit 2.

The image pickup section 1 is constituted of a CCD camera, a camera controller and the like. Image pickup section 1 can pick up an image in the forward state viewed from a driver's vehicle.

Control unit 2 incorporates an arithmetic processing unit such as a microcomputer. Control unit 2 can be so constituted as to carry out the following operations:

1. With image pickup section 1, pick up the image in the forward state viewed from the driver's vehicle.
2. Set a small area for detecting a lane marker, corresponding to the image (picked up with image pickup section 1) in the forward state viewed from the driver's vehicle.
3. Carry out a filtering process for clarification (enhancement) of an edge of the lane marker (in other words, the edge is a boundary between the lane marker and a road surface).
4. From each of the small areas, sample a part of the lane marker that is most likely to be the lane marker.
5. Detect the thus sampled lane marker as a lane marker candidate point.
6. From positional information on a picture image of the lane marker candidate point(s), calculate the following travel road model parameters and the like:
   i) a lateral displacement A of the driver's vehicle, relative to a travel lane.
   ii) a travel lane curvature B defined by the lane marker.
   iii) a yaw angle C of the driver's vehicle, relative to the travel lane.
   iv) a pitch angle D of the driver's vehicle.
   v) a height H from a ground at which height image pickup section 1 (such as the CCD camera) is installed.

According to the embodiment, there is provided a premise that image pickup sensor 1 such as the CCD camera is of what is called a simple eye (to be described afterward).

Described hereinafter is a principle of calculating the travel road model parameters from the image in the forward state (viewed from the driver's vehicle) picked up with image pickup section 1.

Figure 2:
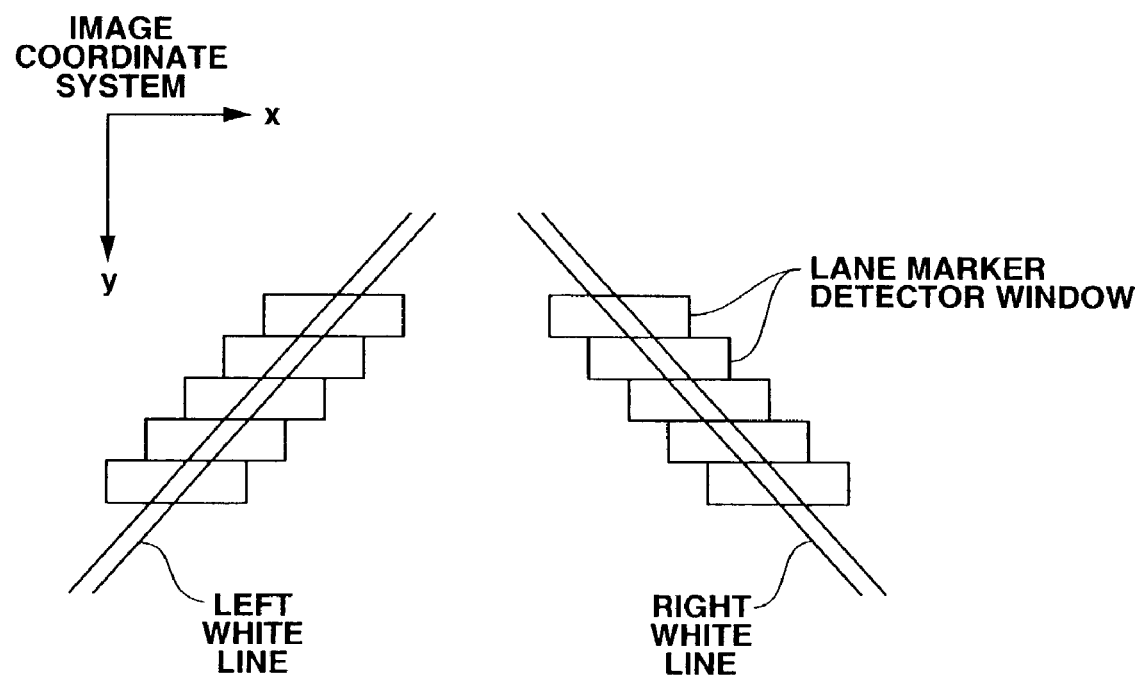
FIG. 2 shows small areas for detecting lane markers (lane marker detector windows)

As is seen in FIG. 2, there is provided a plane coordinate system on an image plane in accordance with image scanning directions defined by a television communication method such as NTSC (National Television System Committee) system. More specifically, there is set an orthogonal two-dimension coordinate system having an origin on an upper left of the image plane, an x-axis extending horizontally from left to right, and a y-axis extending vertically from upper to lower.

In a picture image of forward view from the driver's vehicle, there are set the small areas for detecting the lane marker (in other words, "lane marker detector windows").

According to the embodiment, the small areas are totally ten in number. Five of the small areas are so set on each of a right side and a left side of the image plane as to correspond to one of the two lane markers disposed respectively on a right side and a left side of the travel lane for the driver's vehicle.

Position of each of the lane marker detector windows is determined by the following travel road model parameters and the like, namely, lateral displacement A (of the driver's vehicle) relative to the travel lane, travel lane curvature B defined by the lane marker, yaw angle C (of the driver's vehicle) relative to the travel lane, pitch angle D of the driver's vehicle, height H from the ground at which height image pickup section 1 (such as the CCD camera) is installed. Hereinabove, the travel road model parameters can be calculated through a method to be described afterward.

Next, the following operations can be taken:

1. In each of the lane marker detector windows which are set in the picture image of the forward view from the driver's vehicle, carry out a preprocessing for detecting the lane marker. The preprocessing is to differentiate a primary space, to thereby enhance the boundary between the lane marker and the road surface (namely, the boundary is the edge of the lane marker). Hereinabove, used for the primary space differentiation is, for example, Sobel filter.
2. Detect the lane marker candidate point for detecting the lane marker.

Of the boundaries between the lane marker and the road surface, detected is the boundary that is disposed inside the travel lane for the driver's vehicle, according to the embodiment.

More specifically, the lane marker candidate point can be determined in the following manner:

When the filter output is positive with a pixel on the left side (small value on x-coordinate) of the image more brilliant than a pixel on the right side of the image, the lane marker candidate point is a point (pixel) that features the filter output not smaller than a threshold of a predetermined positive value, for example, on the lane marker (white line in FIG. 3) detector window on the left side of the travel lane.

Contrary to the above, on the lane marker detector window on the right side of the travel lane, the lane marker candidate point is a point (pixel) that features the filter output not greater than a threshold of a predetermined negative value.

All applicable points can be selected as the lane marker candidate point.

Described hereinafter is setting of a lane marker candidate line corresponding to the thus detected lane marker candidate points. The lane marker candidate line can be set from an aggregation of the lane marker candidate points. Methods of setting the lane marker candidate line may include Hough transform, least square method, and the like. Herein, Hough transform is exemplified.

At first, the following expression (1) defines a straight line $(a_i, b_i)$:

[Math 1]

$$y = a_i \cdot x + b_i \quad (1)$$

where $a_i$ is a slope, and $b_i$ is an intercept (slice). Moreover, i stands for the number of the lane marker detector window.

Figure 4:
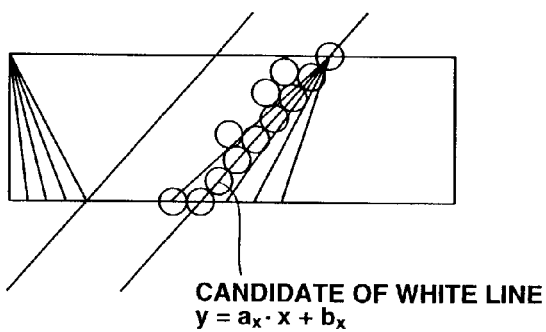
FIG. 4 shows a lane marker candidate line.

As is seen in FIG. 4, on each of the lane marker detector windows, the number of lane marker candidate points through which the straight line ($a_i$, $b_i$) penetrates can be detected. Then, as is seen in FIG. 5, the straight line ($a_i$, $b_i$) and the thus detected number of lane marker candidate points (hereinafter, referred to as "the number of through lane marker candidate points) are recorded in a matrix which is provided for each of the lane marker detector windows. Then, the lane marker candidate line is defined as a straight line satisfying the following:

The number of through lane marker candidate points is not smaller than a predetermined value, and is a maximum value {Herein, a straight line ($a_x$, $b_x$) is applicable to the lane marker candidate line.}.

The lane marker candidate lines can be tabulated in accordance with the lane marker detector windows, as is seen in FIG. 6. The number of through lane marker candidate points smaller than the predetermined value signifies that no lane marker candidate line is provided on the applicable lane marker detector window. Furthermore, the straight line ($a_i$, $b_i$) "through" the lane marker candidate points is defined when a distance between the straight line and the candidate point of white line (pixel) is not greater than a unit pixel.

Then, a typical lane marker point is set for each of the lane marker detector windows. The thus set typical lane marker point is defined as a lane marker detection point. According to the embodiment, as is seen in FIG. 7, the lane marker detection point ($x_{wi}$, $y_{wi}$) is an intersection defined by the lane marker candidate line and an upper side of each of the lane marker detector windows. Moreover, the lane marker candidate line on each of the lane marker detector windows is signified with ($a_{wi}$, $b_{wi}$). Therefore, the lane marker detection point ($x_{wi}$, $y_{wi}$) satisfies the following expression (2):

[Math 2]

$$y_{wi} = a_{wi} \cdot x_{wi} + b_{wi} \quad (2)$$

In addition, it may be regarded that the lane marker detector window without the lane marker candidate line is free from the lane marker detection point.

On the other hand, described hereinafter is a space coordinate system on the travel road.

Figure 8:
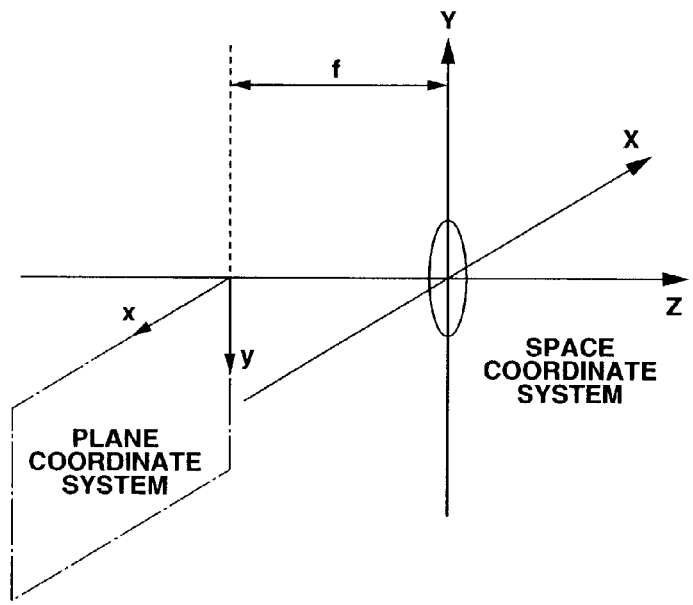
FIG. 8 shows correlation between a plane coordinate system and a space coordinate system.

According to the embodiment, as is seen in FIG. 8, there is provided an orthogonal three-dimension coordinate system having an origin in the center of the image lens of the CCD camera, an x-axis extending horizontally from right to left in such a manner as to form an orthogonality relative to a direction toward the front of the driver's vehicle, a y-axis extending vertically upward in a direction of height of the driver's vehicle, and a z-axis extending toward the front of the driver's vehicle.

For simplification, when the origin of the plane coordinate system on the image plane is positioned on the z-axis of the space coordinate system on the travel road, the space coordinate system on the travel road can be transformed into the plane coordinate system on the image plane according to the following expression (3) and expression (4):

[Math 3]

$$x = -f_h \cdot X/Z \quad (3)$$

$$y = -f_v \cdot Y/Z \quad (4)$$

where each of $f_h$ and $f_v$ is a parameter which is determined by a focal length of the lens of the CCD camera.

Next, plane constitution of the travel road can be generally defined with the following and the like:
1. a straight line.
2. a curve having a constant curvature.
3. a clothoid curve connecting the straight line and the curve, the clothoid curve having a constant rate of change in curvature.

Figure 9A:
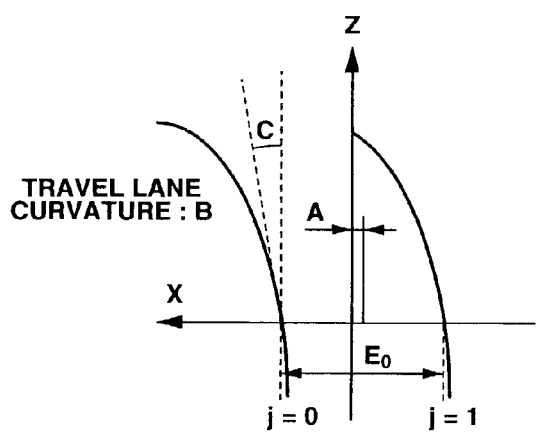
FIG. 9A shows a shape of the lane marker defining a travel lane.
Figure 9B:
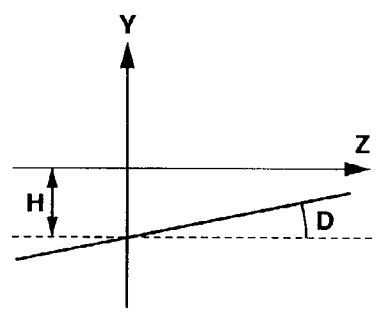
FIG. 9B shows a longitudinal profile of the travel road.

Some tens of meters ahead of the driver's vehicle can be regarded as a curved road (having the constant curvature) or a straight road. The following expression (5) formulates a shape of the lane marker specifying the travel lane, as is seen in FIG. 9A, and the following expression (6) formulates a shape of a longitudinal cross section (substantially a constant gradient), as is seen in FIG. 9B:

[Math 4]

$$X = B \cdot Z^2/2 + C \cdot Z + A - j \cdot E_0 \quad (5)$$

$$Y = D \cdot Z - H \quad (6)$$

According to the embodiment, calculation of the various travel road model parameters described above with a lane width $E_0$ of the travel lane uses Kalman filter. From the expression (3) to the expression (6), the following expression (7) is obtained:

[Math 5]

$$x = (-A + j \cdot E_0) \cdot f_h \cdot (y + f_v \cdot D)/(H \cdot f_v) - B \cdot H \cdot f_v \cdot f_h/(y + f_v \cdot D) - C \cdot f_h \quad (7)$$

where j="0" for the left lane marker of the travel lane for the driver's vehicle, while j="1" for the right lane marker of the travel lane for the driver's vehicle.

The expression (7) may be used as an output equation constituting an extended Kalman filter. From the travel road curvature and vehicle state quantity, the expression (7) can calculate the x-coordinate corresponding to the y-coordinate defined on the picture image plane.

Hereinabove, an estimated state quantity (the travel road model parameters) by the Kalman filter include: lateral displacement A, travel lane curvature B, yaw angle C, pitch angle D of the driver's vehicle, height H from the ground at which height image pickup section 1 (such as the CCD camera) is installed. The parameter $f_h$ (determined by the focal length of the lens), the parameter $f_v$ (determined by the focal length of the lens), and the lane width $E_0$ are set constant. Satisfying the lane marker detection point ($x_{wi}$, $y_{wi}$), the expression (7) can be replaced with the following expression (8):

[Math 6]

$$x_{wi} = (-A + j \cdot E_0) \cdot f_h \cdot (y_{wi} + f_v \cdot D)/(H \cdot f_v) - B \cdot H \cdot f_v \cdot f_h/(y_{wi} + f_v \cdot D) - C \cdot f_h \quad (8)$$

Japanese Patent Unexamined Publication No. Heisei 6(1994)-020189 describes a method of calculating each of the above travel road model parameters with the Kalman filter which is constituted of a proper output equation equivalent to the above expression (8). Thus, detailed description of the expression (8) is to be omitted.

It has been proved that the expression (8) alone cannot accurately calculate all of the travel road model parameters. More specifically described as follows:

The expression (8) includes the travel road model parameters which are five in number. An accurate calculation of all the five travel road model parameters requires (image information on) at least one lane marker detection point for the lane marker on each of the right side and the left side of the travel lane for the driver's vehicle. In addition, the above calculation requires (image information on) at least five lane marker detection points in total.

Contrary to the above, in case the lane marker detection point(s) is detectable, for example, only on the left side of the travel lane for the driver's vehicle, the following expression (9) may replace the expression (8):

[Math 7]

$$x_{wi}=(-A) \cdot f_h \cdot (y_{wi}+f_v \cdot D)/(H \cdot f_v)-B \cdot H \cdot f_v \cdot f_h/(y_{wi}+f_v \cdot D)-C \cdot f_h \quad (9)$$

Even k times height H {from the ground at which height image pickup section 1 (such as the CCD camera) is installed} can satisfy the expression (9), with k times lateral displacement A and 1/k times (one kth of) travel lane curvature B. Hereinabove, lateral displacement A and travel lane curvature B cannot be determined.

On the other hand, in case the lane marker detection point(s) is detectable only on the right side of the travel lane for the driver's vehicle, the expression (9) may also replace the expression (8). In other words, the description concerning the left side as described above can hold true to the right side.

In case of a stereo method (namely, when the CCD cameras are installed both on the left side and the right side), two expressions (not equivalent to each other) corresponding to the expression (9) can be given. Therefore, even detection of one-side (left or right) lane marker can achieve accurate calculation of all the travel road model parameters.

According to the embodiment, when the lane marker on only one of the right side and the left side of the travel lane for the driver's vehicle is detectable (namely, detection of one-side lane marker) as described above, a distinctive part of a forward vehicle traveling ahead of the driver's vehicle can help calculate accurately the other parameters. For example, the distinctive part can be a back number plate of the forward vehicle.

Figures 10, 11:
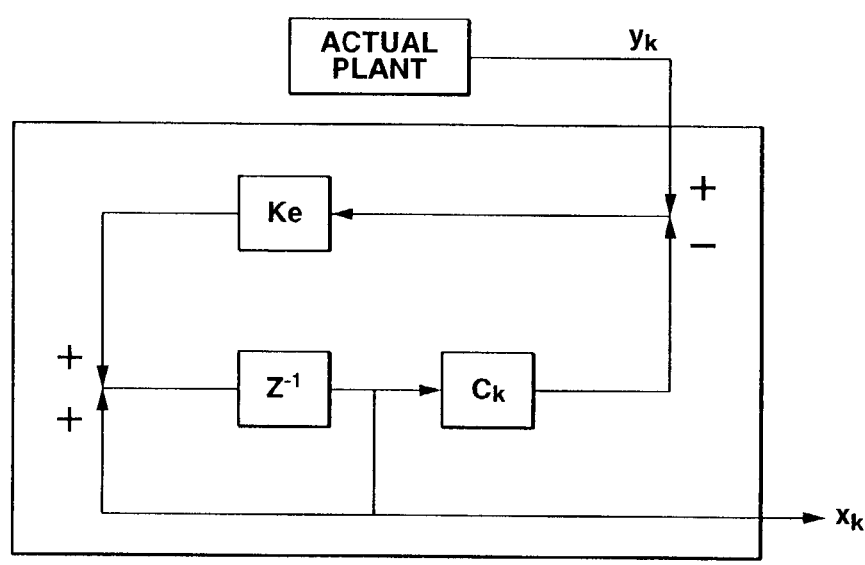
FIG. 10 shows a template for detecting a number plate of a forward vehicle ahead of a driver's vehicle.
FIG. 11 shows a block diagram showing an example of Kalman filter.

Detection of the back number plate can be carried out, for example, in a template matching. The back number plate can be determined in terms of shape (aspect ratio). Therefore, as is seen in FIG. 10 for example, a plurality of the templates (having the above determined aspect ratio) are prepared in advance. Then, the plurality of the templates are moved on the image. Then, an inner product of the pixel brilliance is given. Higher inner product of the pixel brilliance signifies existence of an object having similar brilliance distribution on the image (coordinate of the template). Namely, the above existing object can be supposed to be the back number plate. Then, the coordinate (of the template) and the inner product (of the pixel brilliance) are to be stored as data. The inner product (of the pixel brilliance) greater than its previous value may require renewal of the coordinate (of the template) and the inner product (of the pixel brilliance).

As a result, the back number plate of the forward vehicle can be thus detected by the template matching. Then, a scale (longitudinal or lateral) of the template (namely, a scale on the image) and standard of an actual number plate may contribute to calculation of a height $H_{pc}$ (from the ground) of the number plate of the forward vehicle. More specifically, height $H_{pc}$ is a distance from the ground to a vertical center of the number plate of the forward vehicle. A center point of the number plate is defined as a detection point. An actual coordinate ($Y_{pc}$, $Z_{pc}$) of the detection point in the center of the number plate is given by the following expression (10) and expression (11):

[Math 8]

$$Y_{pc}=L \cdot \sin(D)+(H_{pc}-H) \cdot \cos(D) \quad (10)$$

$$Z_{pc}=L \cdot \cos(D)-(H_{pc}-H) \cdot \sin(D) \quad (11)$$

where L stands for a length from the driver's vehicle to the number plate of the forward vehicle, and $H_{pc}$ stands for the height (from the ground) of the number plate of the forward vehicle.

Since pitch angle D is minor, the expression (10) and the expression (11) can respectively be approximated to the following expression (12) and expression (13):

[Math 9]

$$Y_{pc}=L \cdot D+(H_{pc}-H) \quad (12)$$

$$Z_{pc}=L-(H_{pc}-H) \cdot D \quad (13)$$

An actual coordinate ($X_{pl}$, $Y_{pl}$, $Z_{pl}$) at a left end of the number plate satisfies the following expression (14), expression (15), and expression (16).

[Math 10]

$$Y_{pl}=Y_{pc} \quad (14)$$

$$Z_{pl}=Z_{pc} \quad (15)$$

$$X_{pl}=W_p/2+X_{pc} \quad (16)$$

where $W_p$ is an actual width of the number plate, and $X_{pc}$ is an actual X-coordinate in the center of the number plate.

On the other hand, an image coordinate ($x_{pc}$, $y_{pc}$) in the center of the number plate can be given by the following expression (17) and expression (18), respectively, in accordance with the expression (3) and the expression (4):

[Math 11]

$$x_{pc}=-f_h \cdot X_{pc}/Z_{pc} \quad (17)$$

$$y_{pc}=-f_v \cdot Y_{pc}/Z_{pc} \quad (18)$$

Likewise, an image coordinate ($x_{pl}$, $y_{pl}$) in the center at the left end of the number plate can be given by the following expression (19) and expression (20), respectively, in accordance with the expression (3) and the expression (4):

[Math 12]

$$x_{pl}=-f_h \cdot X_{pl}/Z_{pl} \quad (19)$$

$$y_{pl}=-f_v \cdot Y_{pl}/Z_{pl} \quad (20)$$

Summarizing the expression (14) to expression (20) can give the following expression (21) and expression (22):

[Math 13]

$$x_{pl}=-f_h \cdot (W_p/2)/\{L-(H_{pc}-H) \cdot D\}+x_{pc} \quad (21)$$

$$y_{pl}=-f_v \cdot \{L \cdot D+(H_{pc}-H)\}/\{L-(H_{pc}-H) \cdot D\} \quad (22)$$

Therefore, using pitch angle D and height H (of the CCD camera from the ground) which are calculated in the detection of both-side lane marker leaves only the following two unknown in the expression (21) and the expression (22):
1. Length L from the driver's vehicle to the number plate of the forward vehicle.
2. Height $H_{pc}$ (from the ground) of the number plate of the forward vehicle.
Calculation of length L and height $H_{pc}$ is rendered possible.

The expression (21), the expression (22), and the expression (8) can be used for the detection of the one-side lane marker. In case height $H_{pc}$ (from the ground) of the number plate of the forward vehicle is the same as height $H_{pc}$ obtained in the detection of the both-side lane marker, six quantities are left unknown. Therefore, detecting four lane marker detection points for the one-side lane marker can give six expressions in total. Namely, the expressions (8) four in number, the expression (21) one in number and the expression (22) one in number. Thereby, accurate calculation of all the above six unknown quantities becomes possible.

Then, there are defined x values on the four lane marker detection points respectively as $x_{d0}$, $x_{d1}$, $x_{d2}$ and $x_{d3}$ to be assigned to the expression (8). Then, a vector $y_k$ is defined by the following expression (23) having a component of the left side of each of the four expressions (8), the expression (21), and the expression (22):

[Math 14]

$$y_k = [x_{d0} x_{d1} x_{d2} x_{d3} x_{pl} y_{pl}]' \tag{23}$$

On the other hand, the travel road model parameter is designated as $x_k$ and defined by the following expression (24):

[Math 15]

$$\text{=i } x_k = [ABCDHL]' \tag{24}$$

Thereby, the vector $y_k$, the travel road model parameter $x_k$ can be correlated by the following expression (25):

[Math 16]

$$y_k = f(x_k) + n_k \tag{25}$$

where f stands for a nonlinear function given by the expression (8), the expression (21) and the expression (22), while $n_k$ stands for an observation noise.

Since the Kalman filter is linear, the expression (25) needs to be linearized. Therefore, the expression (25) is partially differentiated, to thereby obtain the following expression (26) featuring linearity:

[Math 17]

$$y_k = Df(x_k)/Dx_k|x_k = x_k(n) + n_k \tag{26}$$

where $Df/Dx|x = x_0$ is a partial differential coefficient of the nonlinear function f when $x = x_0$.

The partial differential coefficient can be a matrix with a column having dimension of the vector $y_k$ and a row having dimension of the travel road model parameter $x_k$. The partial differential coefficient (matrix) is designated by Ck. FIG. 11 is a constitution of the Kalman filter described above. Ke is referred to as Kalman gain. The Kalman gain Ke can be determined based on variance in the observation noise $n_k$ described in the expression (25) and the expression (26), and variance in a process noise $w_k$ to be described afterward {see the following expression (28)}. Details of the Kalman gain Ke are omitted from the specification since it is known as Kalman filter theory.

The following expression (27) is a random walk model which approximates a behavior of the travel road model parameter x:

[Math 18]

$$x_k(n) = x_k(n-1) + w_k(n) \tag{27}$$

where "n" signifies a datum of an "n-th" sample, and $w_k$ is referred to as "process noise" which can be approximated on a white Gaussian noise row.

The variance in the process noise $w_k$ can determine the behavior. It is estimated that the greater the variance is, the more easily the variable can vary. The process noise $w_k$ can be defined by the following expression (28):

[Math 19]

$$w_k = [w_k\text{-}A \ w_k\text{-}B \ w_k\text{-}C \ w_k\text{-}D \ w_k\text{-}H \ w_k\text{-}L]' \tag{28}$$

The variance in each component of the process noise $w_k$ is a tuning constant of the Kalman filter. The variance is described with "var( )" on the right side of each of the following expression (29) to expression (34):

[Math 20]

$$\text{var}(w_k\text{-}A) = \text{var\_}A \tag{29}$$

$$\text{var}(w_k\text{-}B) = \text{var\_}B \tag{30}$$

$$\text{var}(w_k\text{-}C) = \text{var\_}C \tag{31}$$

$$\text{var}(w_k\text{-}D) = \text{var\_}D \tag{32}$$

$$\text{var}(w_k\text{-}H) = \text{var\_}H \tag{33}$$

$$\text{var}(w_k\text{-}L) = \text{var\_}L \tag{34}$$

The above values are to be predetermined based on the behaviors of the driver's vehicle and the forward vehicle. Of the above values, variance in length L (from the driver's vehicle to the number plate of the forward vehicle) may be further improved with an actual value (measured value). In other words, the variance in length L is attributable to its sensitivity to tendency of acceleration/deceleration of the driver's vehicle and the forward vehicle. Therefore, the measured value may improve performance of the Kalman filter.

On the other hand, the variance in the observation noise $n_k$ can determine amount of the noise of signal. More specifically, it is regarded that the greater the variance in the observation noise $n_k$ is, the more the noise is included in variable. As a result, the variance observation noise $n_k$ can be estimated in the above manner. The observation noise $n_k$ can be defined by the following expression (35):

[Math 21]

$$n_k = [n_k\text{-}x_{d0} \ n_k\text{-}x_{d1} \ n_k\text{-}x_{d2} \ n_k\text{-}x_{d3} \ n_k\text{-}x_{pl} \ n_k\text{-}y_{pl}]' \tag{35}$$

The variance in each component of observation noise $n_k$ is a tuning constant of the Kalman filter. Each component of observation noise $n_k$ is given by one of the respective right sides of the following expression (36) to expression (41):

[Math 22]

$$\text{var}(n_k\text{-}x_{d0}) = \text{var\_}x_{d0} \tag{36}$$

$$\text{var}(n_k\text{-}x_{d1}) = \text{var\_}x_{d1} \tag{37}$$

$$\text{var}(n_k\text{-}x_{d2}) = \text{var\_}x_{d2} \tag{38}$$

$$\text{var}(n_k\text{-}x_{d3}) = \text{var\_}x_{d3} \tag{39}$$

$$\text{var}(n_k\text{-}x_{pl}) = \text{var\_}x_{pl} \tag{40}$$

$$\text{var}(n_k\text{-}y_{pl}) = \text{var\_}y_{pl} \tag{41}$$

Hereinabove, diminishing the variance in image coordinate $y_{pl}$ in the center at the left end of the number plate of the forward vehicle, in other words, diminishing the upward and downward variance of the number plate as length L (from the driver's vehicle to the number plate of the forward vehicle) becomes greater may further improve performance of the Kalman filter. Herein, height $H_{pc}$ (from the ground) of the number plate of the forward vehicle is presumed to be constant. As a matter of fact, height $H_{pc}$, however, may vary according to a bounce of the forward vehicle. Herein, great length L (from the driver's vehicle to the number plate of the forward vehicle) allows the expression (22) to be approximated to the following expression (42):

[Math 23]

$$y_{pl} = -f_v \cdot \{D + (-H)/L\}/\{1 - (-H)/L \cdot D\} \quad (42)$$

Thereby, when length L (from the driver's vehicle to the number plate of the forward vehicle) is great, variance in height $H_{pc}$ (from the ground) of the number plate of the forward vehicle may cause smaller effect on the variance in image coordinate $y_{pl}$ in the center at the left end of the number plate of the forward vehicle (namely, the upward and downward variance of the number plate of the forward vehicle).

In other words, the closer the number plate of the forward vehicle is to the driver's vehicle (or the smaller the length L is), the lower the approximation accuracy becomes. Therefore, the noise can be supposed to be great.

Summarizing the above, great length L (from the driver's vehicle to the number plate of the forward vehicle) can contribute to a highly accurate estimation. On the other hand, small length L (from the driver's vehicle to the number plate of the forward vehicle) can reduce influence which may be caused by the bounce of the forward vehicle.

Length L (from the driver's vehicle to the number plate of the forward vehicle) is, in many cases, far greater than height H of the CCD camera from the ground or height $H_{pc}$ (from the ground) of the number plate of the forward vehicle. Therefore, the approximation given by the expression (42) is, in most cases, highly accurate. In other words, the expression (42) is highly effective.

Moreover, setting the variance in the following manner may further improve performance of the Kalman filter:

The greater the variance in height $H_{pc}$ (from the ground) of the number plate of the forward vehicle is, the greater the variance in image coordinate $y_{pl}$ in the center at the left end of the number plate of the forward vehicle (namely, the upward and downward variance of the number plate of the forward vehicle) can become.

Namely, the less likely the forward vehicle is to cause the bounce, the higher the accuracy can become when height $H_{pc}$ (from the ground) of the number plate of the forward vehicle is fixed. In other words, the forward vehicle that is likely to cause the bounce may decrease approximation accuracy. In this case, the noise can be supposed to be great.

With this, the forward vehicle that is unlikely to cause the bounce can contribute to highly accurate estimation, while the forward vehicle that is likely to cause the bounce can decrease the influence which may be caused by the bounce of the forward vehicle.

The above summarizes that the closer the forward vehicle is to the driver's vehicle, the more decreased the approximation accuracy is. Moreover, the approximation accuracy may decrease with the following two combined:

1. the forward vehicle is likely to cause the bounce, and
2. vehicle-to-vehicle distance is small Thus, an upper limit of the variance in height H of the CCD camera from the ground is to be set. In case the calculated variance in height H of the CCD camera from the ground is greater than the upper limit, height H of the CCD camera from the ground may be fixed at a predetermined value for calculation of each of the travel road model parameters.

Figure 12:
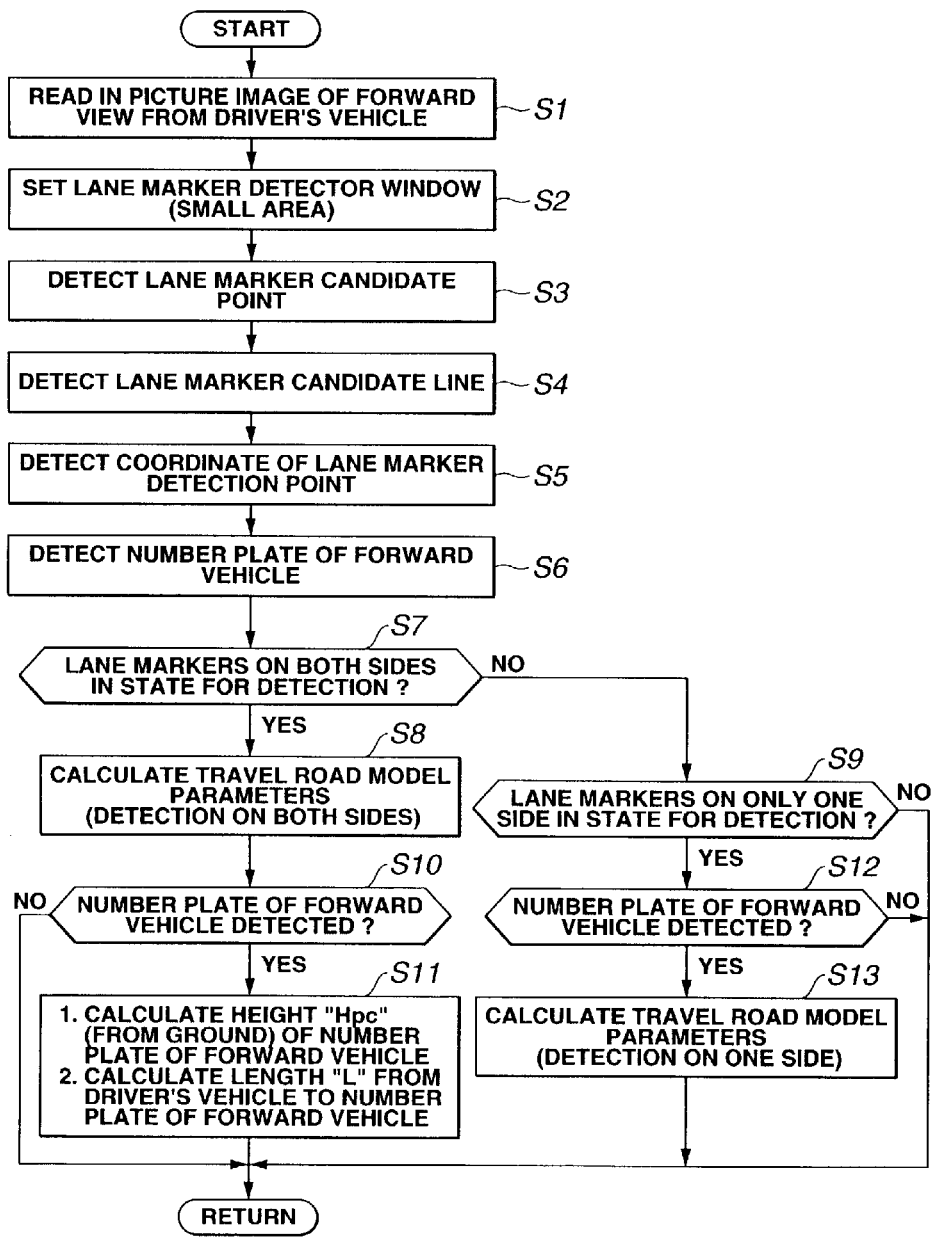
FIG. 12 shows a flow chart for an arithmetic processing for calculating travel road model parameters, which arithmetic processing is carried out in a control unit 2 shown in FIG. 1.

Hereinafter described in accordance with a flow chart is an arithmetic processing for calculating the travel road model parameters with control unit 2, as is seen in FIG. 12.

In the arithmetic processing unit such as the microcomputer, the arithmetic processing may be carried out, as timer interrupt, at a predetermined sampling time ΔT, for example, about 10 msec. The arithmetic processing can take the following steps:

<Step 1>:The routine reads in the picture image of the forward view from the driver's vehicle, which forward view is the one that is picked up with image pickup section 1.

Then, the routine proceeds to the subsequent step 2.

<Step 2>:As is seen in FIG. 2, the routine sets the small areas (lane marker detector windows) in the picture image (read in at step 1) of the forward view from the driver's vehicle, so as to detect the lane marker.

Then, the routine proceeds to the subsequent step 3.

Figure 3:
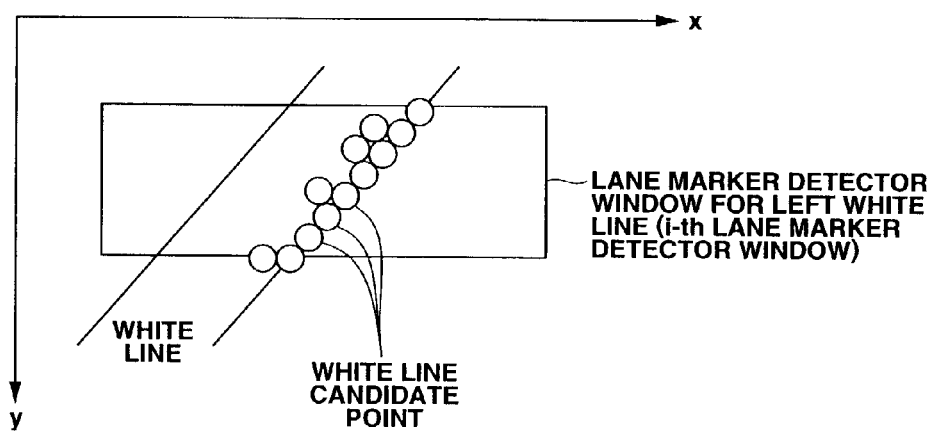
FIG. 3 shows lane marker candidate points.

<Step 3>:In the lane marker detector windows which were set at step 2, the routine carries out the primary space differentiation with the filtering, for example, Sobel filter, to thereby enhance the boundary (namely, edge) between the lane marker and the road surface. Then, as is seen in FIG. 3, the routine detects the lane marker candidate points in the lane marker detector windows (after the filtering for enhancing the edge) in the picture image of the forward view from the driver's vehicle.

Then, the routine proceeds to the subsequent step 4.

<Step 4>:The routine detects the lane marker candidate line that most penetrates through the lane marker candidate points (in other words, through the greatest number of lane marker candidate points) in each of the lane marker detector windows detected at step 3, as is seen in FIG. 4 to FIG. 6.

Then, the routine proceeds to the subsequent step 5.

<Step 5>:For each of the lane marker detector windows, the routine detects the lane marker detection point from the lane marker candidate line that is detected at step 4, as is seen in FIG. 7. Then, the routine reads in the coordinate information on the lane marker detection point.

Then, the routine proceeds to the subsequent step 6.

<Step 6>:With the template as is seen in FIG. 10, the routine detects the number plate of the forward vehicle.

Then, the routine proceeds to the subsequent step 7.

<Step 7>:The routine at step 7 determines whether or not the lane marker detection point detected at step 5 is at least one in number for the lane marker on each of the right side and the left side of the travel lane for the driver's vehicle; and whether or not the lane marker detection points detected at step 5 are totally at least five in number for the lane markers on both the right side and the left side of the travel lane for the driver's vehicle. With the determinations on the above two "whethers," the routine determines whether or not the lane markers are in a state for detection on both the right side and the left side of the travel lane for the driver's vehicle.

In case the lane markers are in the state for detection on both the right side and the left side of the travel lane for the driver's vehicle, the routine proceeds to step 8.

Contrary to this, in case the lane markers are not in the state for detection on both the right side and the left side of the travel lane for the driver's vehicle, the routine proceeds to step 9.

<Step 8>:The routine may use Kalman filter described in Japanese Patent Unexamined Publication No. Heisei 6(1994)-020189 so as to calculate the following travel road model parameters and the like (which parameters correspond to the lane markers detected on both the right side and the left side of the travel lane for the driver's vehicle):

1. lateral displacement A.
2. travel lane curvature B.

3. yaw angle C.
4. pitch angle D.
5. height H of the CCD camera from the ground.

Then, the routine proceeds to the subsequent step 10.

<Step 10>: The routine at step 10 determines whether or not the number plate of the forward vehicle is detected.

In case the number plate of the forward vehicle is detected, the routine proceeds to step 11.

Contrary to this, in case the number plate of the forward vehicle is not detected, the routine returns to a main program.

<Step 11>: With the coordinate information on the detected number plate of the forward vehicle as well as height H (of the CCD camera from the ground) and pitch angle D which latter two parameters are calculated at step 8, the routine at step 11 calculates height $H_{pc}$ {(from the ground) of the number plate of the forward vehicle} and length L (from the driver's vehicle to the number plate of the forward vehicle), in accordance with the expression (21) and the expression (22).

Then, the routine returns to the main program.

<Step 9>: On the other hand, the routine at step 9 makes a determination that the lane markers are in a state other than the state for detection on both the right side and the left side of the travel lane for the driver's vehicle. More specifically, the routine determines whether or not the lane marker detection point detected at step 5 is zero in number for the lane marker on one of the right side and the left side of the travel lane for the driver's vehicle; and whether or not the lane marker detection point(s) detected at step 5 is(are) totally less than five in number. In addition, the routine determines whether or not the lane marker on one of the right side and the left side of the travel lane for the driver's vehicle has at least four lane marker detection points. As a result, the routine can determine whether or not the lane marker is in the state for detection on only one of the right side and the left side of the travel lane for the driver's vehicle.

In case the lane marker is in the state for detection on only one of the right side and the left side of the travel lane for the driver's vehicle, the routine proceeds to step 12.

Contrary to this, in case the lane marker is not in the state for detection on only one of the right side and the left side of the travel lane for the driver's vehicle, the routine returns to the main program.

<Step 12>: The routine at step 12 determines whether or not the number plate of the forward vehicle is detected.

In case the number plate of the forward vehicle is detected, the routine proceeds to step 13.

Contrary to this, in case the number plate of the forward vehicle is not detected, the routine returns to the main program.

<Step 13>: The routine at step 13 may use the Kalman filter given by the expression (26) and shown in FIG. 11, so as to calculate length L (from the driver's vehicle to the number plate of the forward vehicle) as well as the following travel road model parameters and the like (which parameters correspond to the lane marker detected on only one of the right side and the left side of the travel lane for the driver's vehicle):

1. lateral displacement A.
2. travel lane curvature B.
3. yaw angle C.
4. pitch angle D.
5. height H of the CCD camera from the ground.

Hereinabove, the calculation at step 13 can be carried out based on a recognition that height $H_{pc}$ (from the ground) of the number plate of the forward vehicle calculated at step 11 is the same at step 13.

Then, the routine returns to the main program.

According to the embodiment, when the lane markers on both the right side and the left side of the travel lane for the driver's vehicle are detected, the Kalman filter and the like can calculate the travel road model parameters including height H of the CCD camera from the ground. Also calculated in the same detection period include: height $H_{pc}$ (from the ground) of the number plate of the forward vehicle, and length L from the driver's vehicle to the number plate of the forward vehicle. Hereinabove, the number plate is calculated as a predetermined distinctive part of the forward vehicle.

Then, when it comes to the state in which the lane marker on only one of the right side and the left side of the travel lane for the driver's vehicle is detectable, the individual Kalman filter and the like with height $H_{pc}$ (from the ground) of the number plate of the forward vehicle can continue the calculation of the travel road model parameters. As a result, the travel road model parameters can be calculated accurately even when only one-side lane marker is detectable.

In the state of detection of one-side lane marker, the calculation accuracy of the travel road model parameters calculated with the Kalman filter can be properly adjusted in accordance with length L (from the driver's vehicle to the number plate of the forward vehicle) in the following manner:

Setting the Kalman gain Ke of the Kalman filter with a recognition that the smaller the detected length L (from the driver's vehicle to the number plate of the forward vehicle detected) is, the greater the upward and downward noise of the predetermined part of the forward vehicle is.

Likewise, in the state of detection of one-side lane marker, the calculation accuracy of the travel road model parameters calculated with the Kalman filter can be properly adjusted in accordance with the scale of upward and downward movement of the forward vehicle in the following manner:

Setting the Kalman gain Ke of the Kalman filter with a recognition that the greater the detected variance in the height $H_{pc}$ (from the ground) of the number plate of the forward vehicle is, the greater the upward and downward variance (noise) of the predetermined part of the forward vehicle is.

Furthermore, likewise, in the state of detection of one-side lane marker, the calculation accuracy of the travel road model parameters calculated with the Kalman filter can be properly adjusted in accordance with the variance in length L (from the driver's vehicle to the number plate of the forward vehicle) in the following manner:

Setting the Kalman gain Ke of the Kalman filter with a recognition that the greater the detected variance in the length L (from the driver's vehicle to the number plate of the forward vehicle) is, the greater the upward and downward variance (noise) of the predetermined part of the forward vehicle is.

Moreover, when the travel road model parameters are allowed for calculation during the calculation of height H (of the CCD camera from the ground), taking the following measure, may prevent the calculation accuracy of the travel road model parameters from being decreased by the variance in height H (of the CCD camera from the ground):

Allowing calculation of the travel road model parameters with height H (of the CCD camera from the ground) fixed at the predetermined value, when the calculated variance in height H (of the CCD camera from the ground) is greater than the predetermined upper limit.

Step 1 to step 13 can be summarized below:

i) Image pickup section 1 in FIG. 1 and step 1 of the arithmetic processing in FIG. 12 constitute a means for picking up the image according to the embodiment.

ii) Step 2 of the arithmetic processing in FIG. 12 constitutes a means for determining the lane marker detection area.

iii) Step 3 to step 5 of the arithmetic processing in FIG. 12 constitute a means for detecting the lane marker.

iv) Step 7 and step 8 of the arithmetic processing in FIG. 12 constitute a means for calculating the travel road model parameters in the detection of the lane markers on both sides.

v) Step 6, step 10 and step 11 of the arithmetic processing in FIG. 12 constitute a means for detecting the number plate of the forward vehicle.

vi) Step 9, step 12, and step 13 of the arithmetic processing in FIG. 12 as well as the Kalman filter in FIG. 11 constitute a means for calculating the travel road model parameters in the detection of the lane marker on one side.

vii) Step 13 of the arithmetic processing in FIG. 12 and the Kalman filter in FIG. 11 constitute a means for calculating height (from the ground) of the means for picking up the image.

Although the present invention has been described above by reference to a certain embodiment, the present invention is not limited to the embodiment described above. Modifications and variations of the embodiment described above will occur to those skilled in the art, in light of the above teachings.

For example, according to the embodiment, the Kalman filter is used for calculating the travel road model parameters. Other methods such as estimation system and least square method can be used for calculating the travel road model parameters.

The entire contents of basic Japanese Patent Application No. P2001-199959 (filed on Jun. 29, 2001 in Japan) of which priority is claimed is incorporated herein by reference, in order to take some protection against mis-translation or omitted portions.

The scope of the present invention is defined with reference to the following claims.

What is claimed is:

1. A travel road detector, comprising:
   1) an image pickup section producing a road image of a forward travel road in front of a driver's vehicle;
   2) a setting section setting, on the road image, small areas for lane marker detection;
   3) a lane marker detector detecting, in the small areas, lane markers on both sides of a travel lane for the driver's vehicle as lane marker detection points;
   4) a first calculator
      determining that a both-side lane marker detecting state is present when the number of lane marker detection points of the lane marker on each side of the travel lane is greater than or equal to a first predetermined numerical quantity, and at the same time the total number of lane marker detection points of the lane markers on both sides of the travel lane is greater than or equal to a second predetermined numerical quantity, and
      calculating, from information on the lane marker detection points, a travel road model parameter representing a shape of the forward travel road when the both-side lane marker detecting state is satisfied;
   5) a forward vehicle detector detecting a height of a predetermined part of a forward vehicle traveling ahead of the driver's vehicle when the both-side lane marker detecting state is present; and
   6) a second calculator
      determining that a one-side lane marker detecting state is present when the both-side lane marker detecting state is not present, and at the same time the number of lane marker detection points of the lane marker on either one side of the travel lane for the driver's vehicle is greater than or equal to a third predetermined numerical quantity, and
      calculating the travel road model parameter from information on the lane marker detection points, and information on the height of the predetermined part of the forward vehicle detected with the forward vehicle detector.

2. The travel road detector as claimed in claim 1, wherein
the forward vehicle detector detects a length from the driver's vehicle to the predetermined part of the forward vehicle,
the second calculator calculates the travel road model parameter with Kalman filter, and
the second calculator sets Kalman gain of the Kalman filter with a recognition that the smaller the detected length from the driver's vehicle to the predetermined part of the forward vehicle is, the greater an upward and downward noise of the predetermined part of the forward vehicle is.

3. The travel road detector as claimed in claim 1, wherein
the forward vehicle detector detects a variance in the height of the predetermined part of the forward vehicle,
the second calculator calculates the travel road model parameter with Kalman filter, and
the second calculator sets Kalman gain of the Kalman filter with a recognition that the greater the detected variance in the height of the predetermined part of the forward vehicle is, the greater an upward and downward noise of the predetermined part of the forward vehicle is.

4. The travel road detector as claimed in claim 1, wherein
the forward vehicle detector detects a variance in a length from the driver's vehicle to the predetermined part of the forward vehicle,
the second calculator calculates the travel road model parameter with Kalman filter, and
the second calculator sets Kalman gain of the Kalman filter with a recognition that the greater the detected variance in the length from the driver's vehicle to the predetermined part of the forward vehicle is, the greater an upward and downward noise of the predetermined part of the forward vehicle is.

5. The travel road detector as claimed in claim 1, wherein the first predetermined numerical quantity is one.

6. The travel road detector as claimed in claim 1, wherein when the number of travel road model parameters calculated with the first calculator calculating the travel road model parameter in the detection of the lane markers on the both sides of the travel lane is "in", the second predetermined numerical quantity is "m".

7. The travel road detector as claimed in claim 1, wherein when the number of travel road model parameters calculated with the first calculator calculating the travel road model parameter in the detection of the lane markers on the both sides of the travel lane is "in", the third predetermined numerical quantity is "m−1".

8. The travel road detector as claimed in claim 1, wherein the predetermined part of the forward vehicle is a number plate.

9. The travel road detector as claimed in claim 1, wherein the travel road detector further comprises a third calculator calculating a height of the image pickup section from a ground, and when the height of the image pickup section from the ground calculated with the third calculator has a variance which is greater than a predetermined upper limit, the second calculator calculates the travel road model parameter by fixing, at a predetermined value, the height of the image pickup section from the ground.

10. The travel road detector as claimed in claim 1, wherein the setting section is arranged to set a plurality of small areas on each side of the travel lane for lane marker detection.

11. A process of detecting a travel road, the process comprising the following operations:
1) producing a road image of a forward travel road in front of a driver's vehicle;
2) setting, on the road image, small areas for lane marker detection;
3) detecting, in the small areas, lane markers on both sides of a travel lane for the driver's vehicle as lane marker detection points;
4) firstly determining that a both-side lane marker detecting state is present when the number of lane marker detection points of the lane marker on each side of the travel lane is greater than or equal to a first predetermined numerical quantity, and at the same time the total number of lane marker detection points of the lane markers on both sides of the travel lane is greater than or equal to a second predetermined numerical quantity;
5) after the first determining operation, firstly calculating, from information on the lane marker detection points, a travel road model parameter representing a shape of the forward travel road when the both-side lane marker detecting state is satisfied;
6) detecting a height of a predetermined part of a forward vehicle traveling ahead of the driver's vehicle when the both-side lane marker detecting state is present;
7) secondly determining that a one-side lane marker detecting state is present when the both-side lane marker detecting state is not present, and at the same time the number of lane marker detection points of the lane marker on either one side of the travel lane for the driver's vehicle is greater than or equal to a third predetermined numerical quantity; and
8) after the second determining operation, secondly calculating the travel road model parameter from information on the lane marker detection points, and information on the height of the predetermined part of the forward vehicle detected with the forward vehicle detector.

12. The process of detecting the travel road as claimed in claim 11, wherein
the process further comprises an operation of thirdly calculating a height of an image pickup section from a ground, the image pickup section being used for the producing operation, and
when the height of the image pickup section from the ground calculated at the third calculating operation has a variance which is greater than a predetermined upper limit, the second calculating operation calculates the travel road model parameter by fixing, at a predetermined value, the height of the image pickup section from the ground.

13. The process of detecting the travel road as claimed in claim 11, wherein a plurality of small areas are set on each side of the travel lane for lane marker detection.

14. A travel road detecting apparatus, comprising:
1) image pickup means for picking up an image of a travel road in front of a driver's vehicle;
2) setting means for setting small areas for detecting a lane marker, on the travel road which is picked with the image pickup means;
3) lane marker detecting means for detecting a part of the lane marker as a lane marker detection point, in the small areas which are set with the setting means;
4) first calculating means
for determining whether or not the lane marker detection point detected with the lane marker detecting means is in a first both-side lane marker detecting state which is established when the number of lane marker detection points of the lane marker on each of both sides of the travel lane for the driver's vehicle is greater than or equal to a first predetermined numerical quantity, and at the same time for determining whether or not the lane marker detection point detected with the lane marker detecting means is in a second both-side lane marker detecting state which is established when the number of lane marker detection points of the lane markers on the both sides of the travel lane for the driver's vehicle is in total at least a second predetermined numerical quantity, and
for calculating from a piece of information on the thus determined lane marker detection point a travel road model parameter for showing a shape of the travel road in front of the driver's vehicle, when both the first both-side lane marker detecting state and the second both-side lane marker detecting state are determined to be established;
5) forward vehicle detecting means for detecting at least a height of a predetermined part of a forward vehicle traveling ahead of the driver's vehicle, when both the first both-side lane marker detecting state and the second both-side lane marker detecting state are determined to be established; and
6) second calculating means
for determining whether or not the lane marker detection point detected with the lane marker detecting means is in a one-side lane marker detecting state which is established as a state other than the first and second both-side lane marker detecting states and is established when the number of lane marker detection points of the lane marker on either one side of the travel lane for the driver's vehicle is greater than or equal to a third predetermined numerical quantity,
for determining whether or not at least the height of the predetermined part of the forward vehicle is detected with the forward vehicle detecting means, and
for calculating the travel road model parameter for showing the shape of the travel road in front of the driver's vehicle, from the following pieces of first information and second information:
the first information on the thus determined lane marker detection points, and
the second information on the thus determined at least the height of the predetermined part of the forward vehicle.

15. The travel road detecting apparatus as claimed in claim 14, wherein the setting means is arranged to set a plurality of small areas on each side of the travel lane for lane marker detection.

16. A method of detecting a travel road, comprising:
producing a road image of a forward travel road in front of a driver's vehicle;
setting, on the road image, small areas for lane marker detection;
detecting, in the small areas, lane markers on both sides of a travel lane for the driver's vehicle as lane marker detection points;
firstly determining that a both-side lane marker detecting state is present when the number of lane marker detection points of the lane marker on each side of the travel lane is greater than or equal to a first predetermined numerical quantity, and at the same time the total number of lane marker detection points of the lane markers on both sides of the travel lane is greater than or equal to a second predetermined numerical quantity;
firstly calculating, from information on the lane marker detection points, a travel road model parameter representing a shape of the forward travel road when the both-side lane marker detecting state is satisfied;
detecting a height of a predetermined part of a forward vehicle traveling ahead of the driver's vehicle when the both-side lane marker detecting state is present;
secondly determining that a one-side lane marker detecting state is present when the both-side lane marker detecting state is not present, and at the same time the number of lane marker detection points of the lane marker on either one side of the travel lane for the driver's vehicle is greater than or equal to a third predetermined numerical quantity; and
secondly calculating the travel road model parameter from information on the lane marker detection points, and information on the height of the predetermined part of the forward vehicle detected with the forward vehicle detector.

17. The method of detecting a travel road as claimed in claim 16, wherein a plurality of small areas are set on each side of the travel lane for lane marker detection.

18. A travel road detector for an automobile vehicle, comprising:

an image pickup section producing a road image of a forward travel road in front of the vehicle;
a setting section setting, on the road image, relatively small windows for lane marker detection;
a lane marker detector detecting, in the small windows, lane markers on both sides of a travel lane for the vehicle as lane marker detection points;
a first calculator
determining that a both-side lane marker detecting state is present when the number of lane marker detection points of the lane marker on each side of the travel lane is greater than or equal to a first predetermined numerical quantity, and, at the same time, the total number of lane marker detection points of the lane markers on both sides of the travel lane is greater than or equal to a second predetermined numerical value, and
calculating, from information on the lane marker detection points, a travel road model parameter representing a shape of the forward travel road when the both-side lane marker detecting state is satisfied;
a forward vehicle detector detecting a height of a predetermined part of a forward vehicle traveling ahead of the vehicle when the both-side lane marker detecting state is present; and
a second calculator
determining that a one-side lane marker detecting state is present when the both-side lane marker detecting state is not present, and, at the same time, the number of lane marker detection points of the lane marker on either one side of the travel lane for the driver's vehicle is greater than or equal to a third predetermined numerical value, and
calculating the travel road model parameter from information on the lane marker detection points, and information on the height of the predetermined part of the forward vehicle detected with the forward vehicle detector.

19. The travel road detector for an automotive vehicle as claimed in claim 18, wherein the setting section is arranged to set a plurality of small areas on each side of the travel lane for lane marker detection.

* * * * *